(12) United States Patent
Zweig et al.

(10) Patent No.: US 7,942,558 B2
(45) Date of Patent: May 17, 2011

(54) OPTICAL DEVICE FOR LED LIGHT SOURCES

(76) Inventors: Frédéric Zweig, Zurich (CH); Thomas Bührer, Zurich (CH)

( * ) Notice: Subject to any disclaimer, the term of this patent is extended or adjusted under 35 U.S.C. 154(b) by 310 days.

(21) Appl. No.: 12/088,732

(22) PCT Filed: Oct. 2, 2006

(86) PCT No.: PCT/CH2006/000535
§ 371 (c)(1),
(2), (4) Date: Jul. 23, 2008

(87) PCT Pub. No.: WO2007/036064
PCT Pub. Date: Apr. 5, 2007

(65) Prior Publication Data
US 2009/0052193 A1   Feb. 26, 2009

(30) Foreign Application Priority Data
Sep. 30, 2005   (CH) ...................................... 1581/05

(51) Int. Cl.
*F21V 3/00* (2006.01)

(52) U.S. Cl. ................ 362/311.06; 362/311.1; 362/560; 362/326; 362/332; 362/336

(58) Field of Classification Search ............. 362/311.06, 362/311.1, 560, 326, 327, 332, 333, 334, 362/335, 336, 337, 338; 385/31, 39, 901
See application file for complete search history.

(56) References Cited

U.S. PATENT DOCUMENTS

| | | | |
|---|---|---|---|
| 4,767,172 A | 8/1988 | Nichols et al. | |
| 4,941,072 A * | 7/1990 | Yasumoto et al. | ....... 362/249.06 |
| 5,349,504 A | 9/1994 | Simms et al. | |
| 5,526,190 A * | 6/1996 | Hubble et al. | ................ 359/719 |
| 5,555,161 A | 9/1996 | Roe et al. | |
| 6,547,423 B2 | 4/2003 | Marshall et al. | |
| 7,378,686 B2 * | 5/2008 | Beeson et al. | ................ 257/100 |
| 7,465,074 B2 * | 12/2008 | Blumel | ........................ 362/335 |
| 7,473,013 B2 * | 1/2009 | Shimada | ....................... 362/327 |
| 2002/0080615 A1 | 6/2002 | Marshall et al. | |

OTHER PUBLICATIONS

International Search Report for International application No. PCT/CH2006/000535.

* cited by examiner

*Primary Examiner* — Jong-Suk (James) Lee
*Assistant Examiner* — Mark Tsidulko
(74) *Attorney, Agent, or Firm* — Kleinberg & Lerner, LLP; Marvin H. Kleinberg

(57) ABSTRACT

Optical device and optical component part for the targeted reproduction of light emitted by LED light sources (6). The optical device comprises at least two component parts, a first optical component part (10) in the form of a solid waveguide and another component part for connection to the LED light source (6). In a system of Cartesian co-ordinates, the first optical component part (10) has a length in the y direction shorter than or equal to its length in the z direction and shorter than or equal to its length in the x direction. An envelope of the first optical component part (10) projected in an x-y plane forms essentially a rectangle. Proceeding from an x-y plane, the optical component part (10, 10') tapers in the z direction to maximum ¼ of the largest width measured along y (By, max), with any design of the y-z flanks of the optical component part (10, 10').

18 Claims, 4 Drawing Sheets

OPTICAL DEVICE FOR LED LIGHT SOURCES

LED light sources emit light in a very wide solid angle. Consequently, they can scarcely be used in practice for illumination tasks or decoration tasks without optics.

Different optics are known for LED light sources, their goal being to focus the widely scattered LED light, or to deflect the light into specific solid angles. An example of this is given in U.S. Pat. No. 5,349,504 where there is placed in a housing a solid waveguide that uses a specific beam path to enable light of two LED light sources arranged in parallel to be deflected to two separate light exit surfaces.

The subject matter of the present invention is an optical device in accordance with the features of the preamble of claim 1.

The goal of the present invention is to make available an optical device for LED light sources that generate focussed light that has within a half angle of at most 60° about a defined main axis a clearly defined intensity distribution curve, it being possible to define a number of main axes.

This object is achieved by an optical device in accordance with the features of claim 1. Such an optical device comprises two or more individual parts, one individual part serving the purpose of connection to the LED light source and being capable of connection to at least one first individual optical part. The at least one first individual optical part is a solid waveguide whose longitudinal extent in the y-direction is smaller than in the z-direction, the longitudinal extent of the body in the z-direction being smaller than or equal to the longitudinal extent in the x-direction, and an envelope, projected into the x-y plane, essentially yielding a rectangle and, proceeding from the x-y plane, the body tapering in the z-direction to a maximum of ¼ of the greatest width in the y-direction ($B_{y,max}$) with any desired fashioning of the y-z flanks of the body. The optical device serves the purpose of focusing light from LED sources by means of a body that has essentially a rectangular plan. This is advantageous, inter alia, because a large proportion of currently used luminaires are rectangular.

The first individual optical part—and therefore also the optical device that comprises in its optically active part at least one such individual optical part—has a refractive index that deviates from 1 by at least +/−0.1. The first individual optical part, as also the optical device, has/have an x-y flank and an (−x)-(−y) flank, an x-z flank and an (−x)-(−z) flank as well as a y-z flank and a (−y)-(−z) flank, with the (−x)-(−y) flank and, in some circumstances, also the y-z flank or (−y)-(−z) flank serving as main exit surfaces for the light. It is possible in this way to define for illumination purposes, for example, only one main axis (exit surface at the (−x)-(−y) flank of the first individual optical part or the optical device), and the light will ideally have as rectangular a distribution as possible within a half angle of 4°-40°, the aim being a wide maximum with an intensity of more than 80% of the light exiting from the optics, as well as flanks that are as steep as possible, and as small as possible a minimum with less than 10% of the light exiting from the optics outside the desired angle about the main axis. For decorative purposes, by contrast, there is frequently a desire for a number of main axes of the light exit that are located either at the x-y flank of the optical device owing to the fashioning of the beam path in the device or of the first individual optical part, or even at the (−x)-(−y) flank and the y-z flank or (−y)-(−z) flank of the same, all these flanks then forming main exit surfaces for the light.

Both the first individual optical part and the optical device are bounded by a number of outer surfaces that preferably respectively execute an optical function for example as reflector and/or as lens and/or as beam splitter etc.

In a specific embodiment, a cavity or a number of cavities of any desired shape is/are provided in the at least one individual optical part, and thus also in the optical device. Each cavity has cavity boundary surfaces that bound the cavity and act as mirrors and/or lenses and/or beam splitters inside the individual part or the optical device. Specific fashioning and arrangement of the cavity/cavities permits the beam path to be adapted to the respective requirements. The cavities preferably extend parallel to the y-direction in their longitudinal extent, particularly being fashioned as continuous cavities from the x-z flank up to the (−x)-(−z) flank. This last permits a particularly simple production of the cavities.

The cavities can currently be produced particularly economically by laser cutting, the laser preferably acting in the normal to the x-z or −(−x)-(−y) plane. In a specific embodiment, the mirror-smooth boundary surfaces of the cavities act in such a way that light is transmitted virtually without deflection, or else is virtually totally reflected.

A number of individual parts can be assembled with particular ease when they are fashioned in such a way that a number of these individual parts can be assembled in a force-closed fashion or can be bonded to one another. The interfitting individual parts complement one another in their optical functionalities in such a way that a targeted end result in the form of an accurately describable and planned distribution of the emission results in terms of location, direction and intensity. Furthermore, the parts complement one another mechanically such that when assembled they yield an overall picture, planned by the engineer/designer, that represents a single part as far as the visual impression is concerned.

Many variations of the forming of the optical device can be achieved where a number of individual parts are combined to form such an optical device and, in the process, the individual parts are, in particular, assembled in a mutually rotated fashion such that their x, y, z axes appear to be interchanged in the finished optical device. For decoration purposes or special solutions, for example, this also results in "beam splitter luminaires" that have a number of main axes of emission about which the light is emitted in a defined intensity curve within a specific angle. In the case of such requirements, there are limiting angles outside which there is no desire for light. Since, however, zero emission is physically impossible, one is restricted to the feasible minimum. The technology described here in particular enables pronounced flat optics, as well as optics of very complex shape in three dimensions—for example as a snow flake, or as imitation quartz, or in any other desired crystal shapes as well as other shapes (hedgehogs, sea urchins, trees, leaves . . . ), adapted in each case to the small size of the light source.

The optical device has an individual part that serves the purpose of connection to the LED. This is preferably fashioned such that the individual part can simply be screwed onto the printed circuit board with the LEDs, or can be connected in some other way to the printed circuit board in a form-fitting or force-closed fashion. Furthermore, the individual part is preferably fashioned such that the optically active part(s) of the optical device can be connected to the individual part simply by being pressed on, for example. In a further specific embodiment, the individual part serving the purpose of connection to the LED light source is fashioned as an individual optical part and can be integrated in the optical device such that the beam path can also be guided through this individual part.

The individual part serving the purpose of connection to the LED light source is fashioned such that it fixes the light source precisely at the point envisaged for the purpose such that it can move only within the given tolerances, that is to say in the range of, for example, 5/100 to 1/10 mm, and thus ensures that the light is emitted in a wholly targeted fashion into the optical device, and is thus emitted in a desired way into the surroundings.

Further embodiments of the optical invention and of the individual optical parts are described in the further dependent claims.

The invention is explained by way of example below with the aid of figures. In the figures, identical objects are denoted in principle with identical reference symbols. In a purely schematic fashion:

Figure 1:
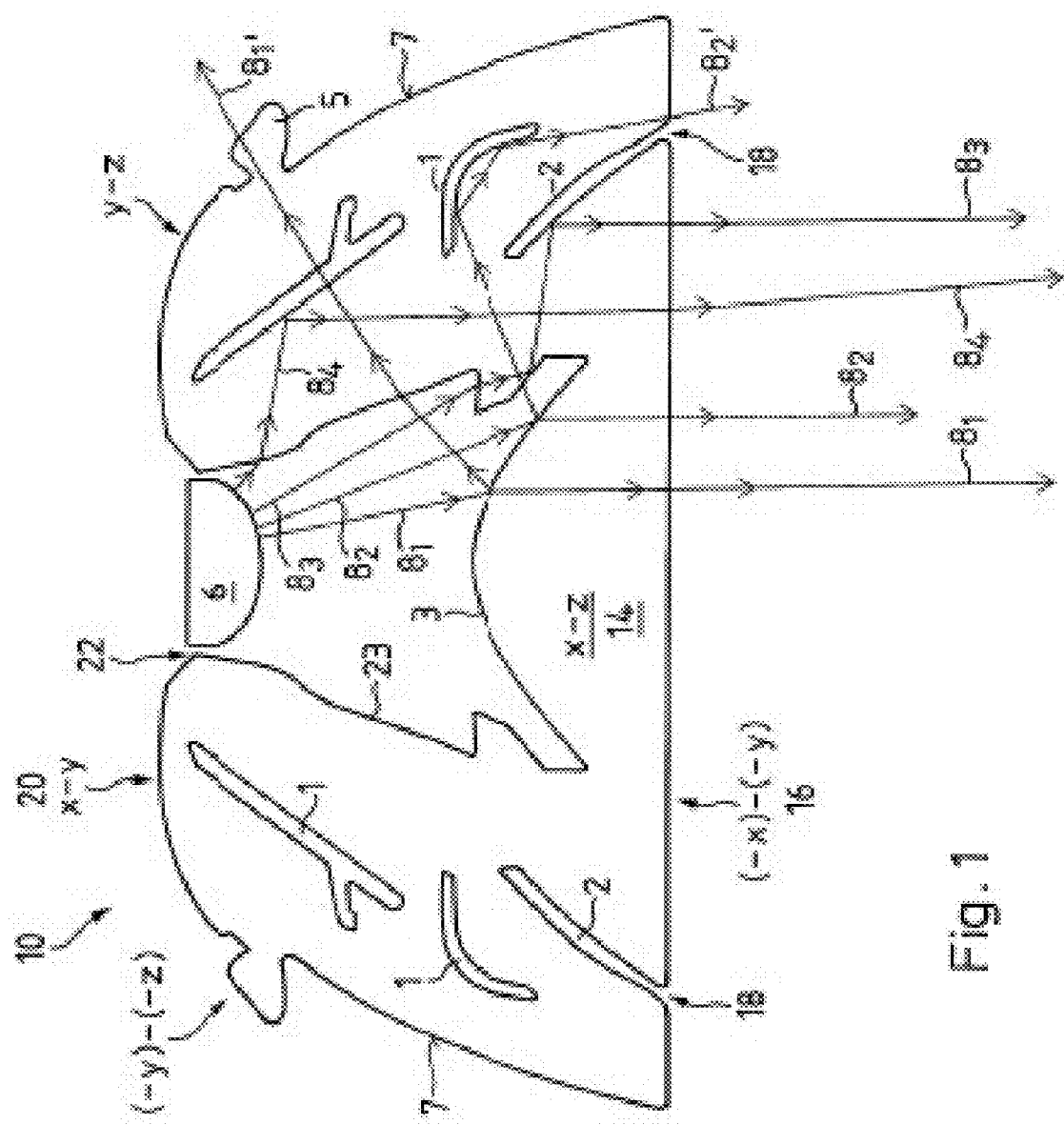
FIG. 1 shows a first inventive individual optical part in side view, looking onto the x-z flank.

FIG. 1 shows a first inventive individual optical part 10 in side view, looking onto the x-z flank that, in this case, has a substantially flat outer surface 14 lying in an x-z plane of a Cartesian coordinate system. This flat outer surface 14, being parallel to the x-z plane is pierced by openings created by cavities 1, 2 extending in the y-direction and are fashioned such that they are continuous from the x-z flank up to the (−x)-(−z) flank. The (−x)-(−z) flank of the individual part 10 has the same dimensions as the x-z flank and is likewise fashioned as a substantially flat outer surface, lying in an x-z plane, with the corresponding openings leading to the cavities 1, 2. The first individual optical part 10 has a longitudinal extent in the y-direction that is smaller than its longitudinal extent in the z-direction, its longitudinal extent in the z-direction being smaller than or equal to its longitudinal extent in the x-direction. In the case of the optics illustrated here, the length ratios are, for example, x=35 mm, y=17.8 mm, z=27 mm. However, an embodiment would also be conceivable in which the outer dimensions yield a cube, the length ratios thus being x:y:z=1:1:1.

In the example shown here, the first individual optical part 10 is formed from PMMA, and the cavities 1, 2 are produced by laser cutting, the laser having acted in the surface normal to the x-z plane in order to produce the cavities 1, 2.

Figure 3:
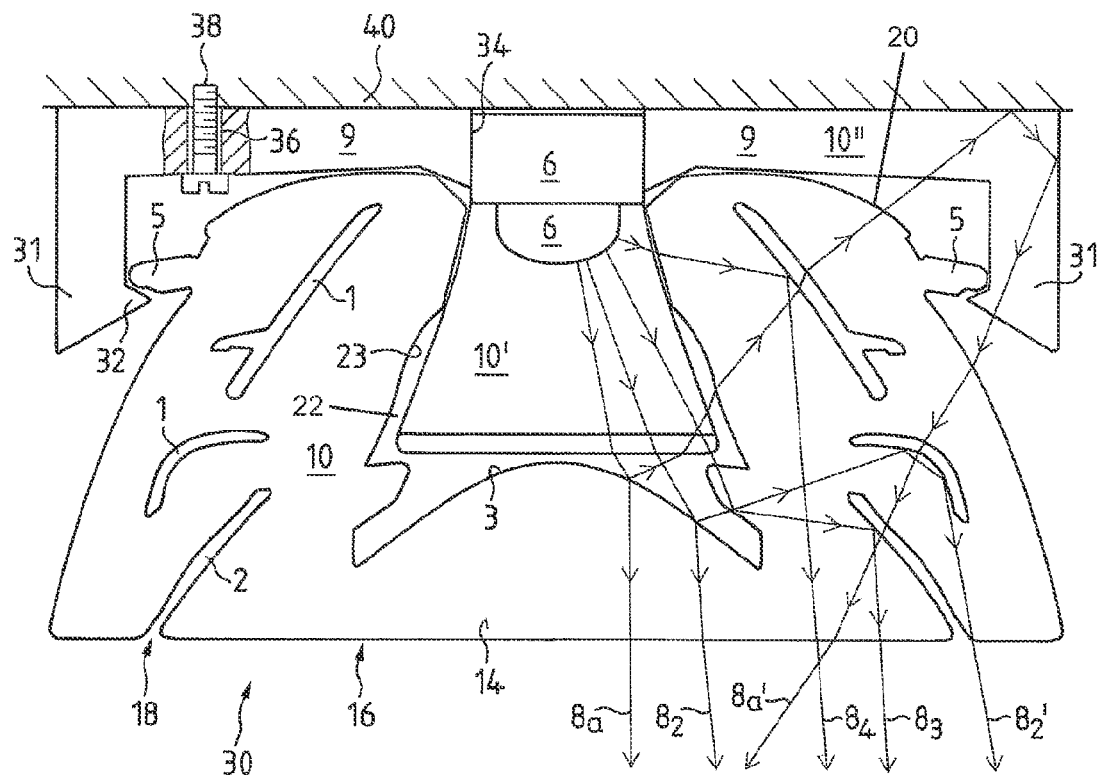
FIG. 3 shows an inventive optical device assembled from three inventive individual optical parts, mounted on a printed circuit board with an LED light source in side view, looking onto the y-x flank.
Figure 4:
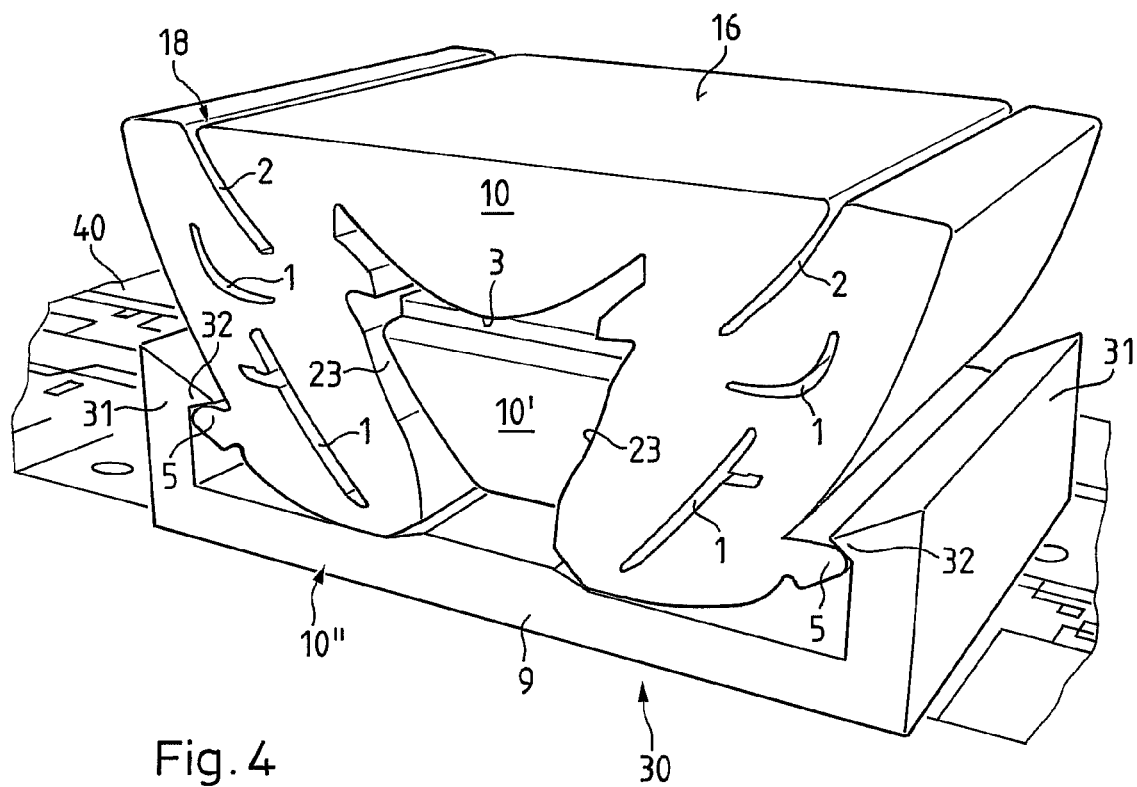
FIG. 4 shows the optical device from FIG. 3 in a perspective view.

The y-z flank and (−y)-(−z) flank of the individual part 10 are configured in a mutually symmetrical fashion as essentially convexly curved outer surfaces 7. Their convex radius of curvature decreases from the x-y flank toward the (−x)-(−y) flank, and finally merges into a flat surface without camber. Provided in the first third of the these flanks, which faces the x-y flank, there is in each case a projection 5 that extends over the entire length in the y-direction and with the aid of which the individual part 10 can be connected to a further individual part 10" via a snap-action mechanism, as is shown in FIGS. 3 and 4. However, such a connection could certainly also be implemented by another type of snap-action or clamping connection, by a screwed connection or, when the connection need not be releasable, also via a bonded connection. Depending on the fashioning of the cavities 1, 2 and the forming of the remaining geometry of the first individual optical part 10, portions of the outer surfaces 7 that lie in the (−x)-(−y) direction can serve as targeted exit surfaces for light. However, if this is not so, only a minimum fraction of scattered light then exits through the entire outer surface 7.

The (−x)-(−y) flank is fashioned as a substantially flat outer surface 16 lying the x-y plane. It has slit-shaped openings 18 that extend in the y-direction and via which the cavities 2 are opened in the direction of the (−x)-(−y) flank. Bearing in mind a virtual outer surface (termed an envelope below) that comprises the outer surface 16 with its openings 18, this envelope yields a rectangle when projected into an x-y plane, as may also be easily recognized from FIG. 4. The x-y flank opposite the (−x)-(−y) flank has an outer surface (20) whose envelope likewise yields a rectangle when projected into the x-y plane. In accordance with the camber of the outer surfaces 7, the extent of this rectangle in the x-y direction is, however, smaller than that of the outer surface 16. The outer surface 20 is slightly convex and has in the middle a cutout 22 for holding a second individual optical part 10' and/or an LED light source 6. An LED light source is shown here by way of example. The cutout 22 extends over approximately two thirds of the first individual optical part 10 in the z-direction and over the entire y-extent of the first individual optical part 10. It has a bottom 3 and side walls 23 that are fashioned in accordance with the requirements for optical refraction, reflection and optical diffraction. In this example, the side walls 23 retreat from the middle such that the cutout 22 expands outward from the outer surface 20 into the interior of the body of the first individual optical part. In this example, the bottom 3 is configured in a fashion cambered like a barrel into the cutout 22.

Illustrated by way of example on the right-hand side in FIG. 1 are a few light beams 8 with their beam path emanating from the LED light source 6. As may be recognized herefrom, the cavities with their boundary surfaces, and the opening with its side walls 23 and the bottom 3, act on the light beams 8 in a fashion that is partially transmitting, refracting, diffracting or totally reflecting. However, it is also possible to produce mixtures of these effects at these boundary surfaces such that partial transmission and partial reflection occur. Light beams $8_1$ and $8_2$ are, for example, for the most part transmitted at the bottom 3 such that they exit from the outer surface 16 as directed, virtually parallel light beams $8_1$, $8_2$. A reflected fraction, occurring in accordance with the laws of optics, of the beams $8_1$, $8_2$ enters the body of the first individual optical part 10 via the side wall 23. The light beam $8_1$ finally transirradiates the cavity 1 and exits from the body of the first individual optical part 10 as scattered light $8_1'$ at the projection 5. Such scattered beams can be eliminated, if required, by means of specific and known coatings (optical coating). In the example shown here, the light scattering is desired and used in a targeted fashion. The light beam $8_2'$ is reflected at the boundary surfaces of the cavity 1 and exits via the outer surface 16 in a fashion approximately parallel to the beams $8_1$, $8_2$. The light beams $8_3$, $8_4$ enter the body of the first individual optical part 10 directly via the side wall 23, a light beam $8_3$ from inside being reflected at the side wall 23 and at the boundary surface of the cavity 2 such that it finally exits from the outer surface 16 as a directed beam $8_3$ in a fashion virtually parallel to the beams $8_1$, $8_2$, $8_2'$. After entering the body of the first individual optical part 10, the light beam $8_4$ is reflected at the boundary surface of the cavity 1 and likewise exits from the outer surface 16 in a fashion approximately parallel to $8_1$, $8_2$, $8_2'$, $8_3$. This shows that the cavities 1, 2 with their boundary surfaces, the opening 22 with its bottom 3 and the side walls 23, and all the outer surfaces 16, 7, 20, execute an optical function and, given appropriate fashioning, can act in a fashion which is both reflecting and transmitting, as well as refracting and/or diffracting.

Figure 2:
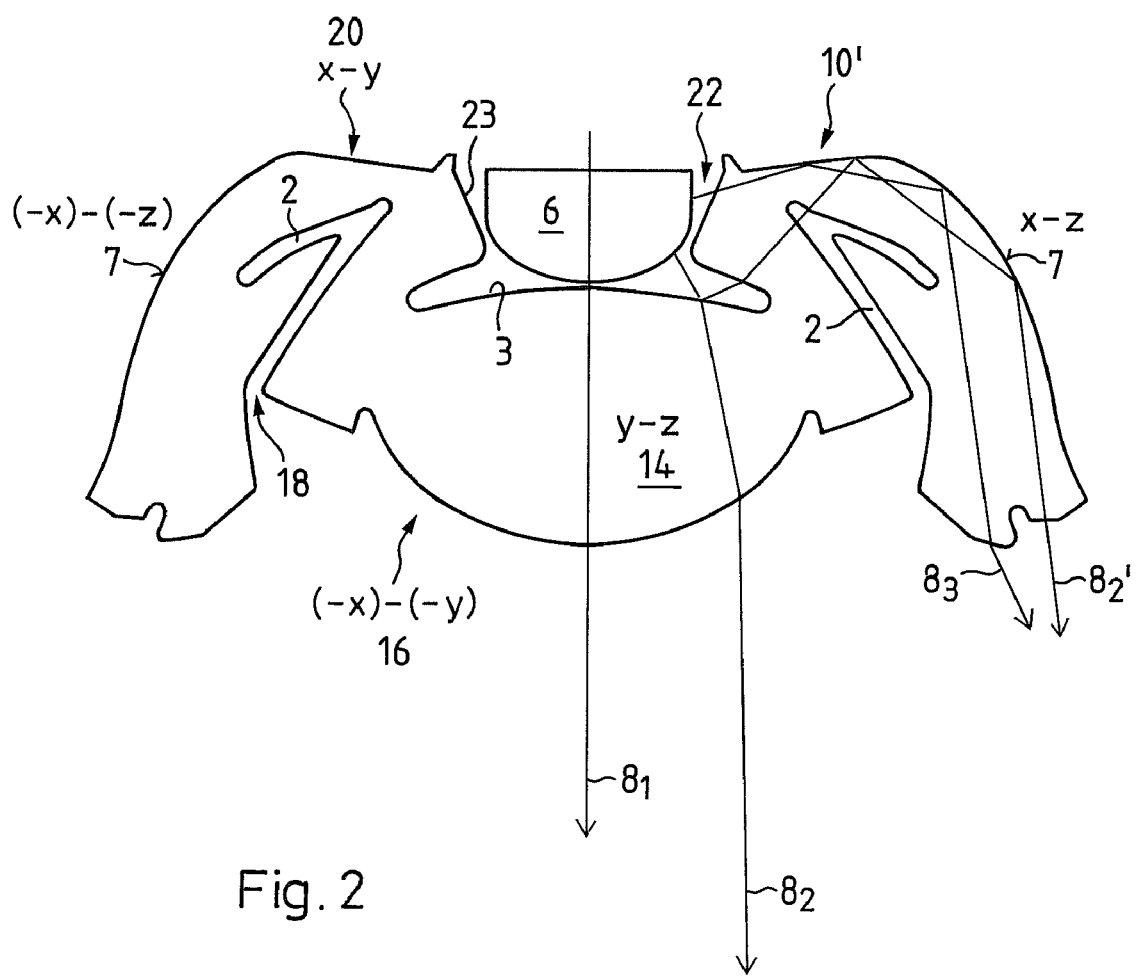
FIG. 2 shows a second inventive individual optical part in side view, looking onto the y-z flank.

FIG. 2 shows a second inventive individual part 10' in side view looking onto its y-z flank. In principle, the second individual optical part 10' is of the same construction as the first individual optical part 10. Its longitudinal extent in the z-direction is smaller than its longitudinal extent in the y-direction, and its longitudinal extent in the y-direction is smaller than or equal to its longitudinal extent in the x-direction. For example, the lengths for the individual part 10' in the example shown here are x=27 mm, y=10.9 mm, z=8.9 mm. Its (−y)-(−z) flank and its y-z flank are configured as substantially flat outer surfaces 14 that are situated in a y-z plane of a Cartesian coordinate system and are pierced by openings of continuous cavities 2 extending in the x-direction, and by cutouts 22. The cavities 2 are open, in turn, toward the (−x)-(−y) flank by means of slit-shaped openings 18. Cavities 1 that are open only toward the (−x)-(−z) and/or the x-z flank are not provided.

If a virtual envelope of a (−x)-(−y) flank 16 of the second individual optical part 10' is projected into an x-y plane, a rectangle is yielded, in turn. The same holds for the opposite x-y flank and its envelope, the rectangle resulting therefrom having, in turn, a shorter extent in the y-direction. The fashioning of the x-y flank and of the (−x)-(−y) flank 16 is otherwise adapted to the requirements for the optical functions, in this case the (−x)-(−y) flank 16 being fashioned in the middle essentially in a way cambered outward in the shape of a barrel.

The outer surfaces 7 of the (−y)-(−z) and y-z flanks are again formed in a mutually symmetrical fashion, specifically in such a way that the body of the second individual optical part 10' tapers from the (−x)-(−y) flank in the z-direction up to the x-y flank. Even if the taper is much smaller in the example shown here, it is certainly conceivable to fashion the body of an inventive individual part so as to yield, starting from a (−x)-(−y) flank, a taper in the z-direction up to the x-y flank to a maximum of a quarter of the greatest width ($B_{x,max}$) measured along x. The (−x)-(−y) flank has, in turn, a cutout 22 for holding an LED light source 6. The cutout 22 extends in this case in the (−z) direction, but only approximately a quarter extends into the body of the second individual optical part 10'. The bottom 3 is configured in turn in a fashion cambered into the cutout 22 in the shape of a barrel. The side walls 23 firstly constrict the cutout 22, and then widen it again toward the bottom 3. The geometry of the cutout 22 or the fashioning of its side walls 23 and its bottom 3 is selected in accordance with the requirements for the optical functions.

FIGS. 3 and 4 show an inventive optical device 30 that comprises two individual optical parts, a first and a second optical part 10 and 10'. The individual parts 10, 10' are configured in a way similar to those in FIGS. 1 and 2. The individual optical parts 10, 10' are placed inside one another in a force-closed fashion, the x-, y- and z-axes of the second individual part 10' being rotated with respect to the x-, y- and z-axes of the individual part 10 such that the z-axes are identically aligned, but the x- and the y-axes of the two individual parts 10, 10' are rotated perpendicularly onto one another by 90°. The first individual optical part 10 is, however, connected via its projections 5 by a snap-action mechanism to a further individual part 10" that is fashioned essentially in the shape of a C. Like the two individual optical parts 10, 10', the C-shaped individual part 10" is an individual optical part made from PMMA. With its two free ends 31, the C-shaped further individual part spans the first individual optical part 10 and grips the projections 5 from behind with the aid of noses 32 arranged in the end region of the free ends 31. Since the free ends 31 interact slightly resiliently with the noses 32, together with the likewise slightly resilient projections 5 they form a snap-action lock via which the individual part 10 with the individual part 10' inserted therein can easily be connected to the individual part 10", but can also be separated again from the latter.

In the middle of its back region 9, the C-shaped further individual part 10" has an opening 34 for holding the housing of the LED light source 6. Furthermore, openings 36 for holding screws 38 are provided in the back region 9 in a fashion spaced apart from the opening 34. Said screws can be used to fix the further individual part 10" to a printed circuit board 40 on which the LED light sources are fastened. On the right-hand side, FIG. 3 again shows different light beams 8 emanating from the LED light source. As shown by the beam 8a, the C-shaped individual part 10" is likewise optically active. The beam 8a passes through the further individual part 10" and strikes the bottom 3 of the first individual optical part 10. It is partially diffracted there and transmitted through the body of the first individual optical part 10 such that it exits from the optical device 30 at the outer surface 16. The other part of the beam 8a is reflected at the bottom 3 of the first individual optical part 10 and, after passing once again through the second individual optical part 10', enters the body of the first individual optical part 10 through the side wall 23. It traverses the cavity 1 and exits again from the body of the first individual optical part 10, after which it enters the C-shaped further individual part, exits therefrom again after multiple reflection via the free end 31 of the further individual part 10", and finally likewise exits from the optical device 30 via the outer surface 16 after a further passage through the first individual optical part 10 and various cavities 1, 2 thereof.

As is shown with the aid of this example for a beam path, it is possible to diminish the losses via scattered light by means of the fashioning of the C-shaped individual part 10" as individual optical part. In the example shown here, however, this leads to the fact that the exiting light is no longer directed homogeneously, since the beam 8a' does not exit from the surface 16 in a fashion parallel to the other beams.

It is clear that the embodiments illustrated in the figures serve the purpose of explaining the invention by way of example. It is clear to a person skilled in the art that there are further possibilities for fashioning the invention. The manner in which it is possible to combine the elements shown in the various figures in a rational way is clear to a person skilled in the art, with the result that the examples shown in the figures in no way act in a limiting fashion.

The invention claimed is:

1. An optical device for the targeted reproduction of light emitted from LED light sources (6), comprising at least two individual optical parts of which one is a first individual optical part (10) in the form of a solid waveguide and a further individual optical part (10") which mechanically connects to the LED light source, said first individual optical part (10) tapering in the z-direction, in a Cartesian coordinate system, proceeding from an x-y plane, characterized in that, said first individual optical part (10) has a longitudinal extent in the y-direction that is smaller than or equal to its longitudinal extent in the z-direction and smaller than or equal to its longitudinal extent in the x-direction, said first individual optical part (10) comprising first and second planar outer surfaces (14) opposing in the x-z plane, said first individual optical part (10) further comprising third and fourth planar or non-planar outer surfaces (16, 20) substantially opposing in the x-y plane, said first individual optical part (10) further comprising fifth and sixth opposing outer surfaces (7) curved in a convex manner with regard to the y-z plane, said third and fourth outer surfaces (16, 20) being square, and said fifth and sixth outer surfaces (7) being curved such that said fourth outer surface has an extent in the x-direction that is smaller than the extent of said third outer surface, wherein the face of said fourth outer surface (20) adjacent to the LED light source (6) contains a cut out (22) for refracting and transmitting the light from the source (6) towards the other faces of said first individual optical part (10).

2. The optical device as claimed in patent claim 1, characterized in that said third outer surface (16) and said fifth or sixth outer surface (7), respectively, of said first individual optical part (10) are main exit surfaces for the light.

3. The optical device as claimed in claim 1 or 2, characterized in that a second individual optical part (10') in the form of a solid waveguide is arranged in said cutout (22) of said first individual optical part (10), said second individual optical part (10') having, in the Cartesian coordinate system, a longitudinal extent in the z-direction that is smaller than or equal to its longitudinal extent in the y-direction and smaller than or equal to its longitudinal extent in the x-direction, and an envelope, projected into an x-y plane, of said second individual optical part (10') essentially yielding a rectangle and, proceeding from a first outer surface in the x-y plane, said second individual optical part (10') tapering in the z-direction to an opposing second outer surface such that said second outer surface has an extent in the y-direction that is smaller than the extent of said first outer surface.

4. The optical device as claimed in patent claim 3, characterized in that said outer surfaces (7, 14, 16, 20) of said first and/or second individual optical part (10, 10') respectively execute an optical function.

5. The optical device as claimed in patent claim 4, characterized in that said first and second individual optical parts (10, 10') are assembled in such a mutually rotated fashion that their x, y axes appear to be interchanged.

6. The optical device as claimed in claim 4, characterized in that said first and second individual optical parts (10, 10') are assembled in a mutually rotated fashion in such a way that their x, y, z axes are at any desired angle relative to one another.

7. The optical device as claimed in patent claim 4, characterized in that said first and second individual optical parts (10, 10') can be assembled in a force-closed fashion, and/or can be bonded to one another.

8. The optical device as claimed in patent claim 3, characterized in that said first and second individual optical parts (10, 10') are assembled in such a mutually rotated fashion that their x, y axes appear to be interchanged.

9. The optical device as claimed in claim 8, characterized in that said first and second individual optical parts (10, 10') are assembled in a mutually rotated fashion in such a way that their x, y, z axes are at any desired angle relative to one another.

10. The optical device as claimed in patent claim 8, characterized in that said first and second individual optical parts (10, 10') can be assembled in a force-closed fashion.

11. The optical device as claimed in patent claim 8, characterized in that said first and second individual optical parts (10, 10') can be bonded to one another.

12. The optical device as claimed in claim 3, characterized in that said first and second individual optical parts (10, 10') are assembled in a mutually rotated fashion in such a way that their x, y, z axes are at any desired angle relative to one another.

13. The optical device as claimed in patent claim 12, characterized in that said first and second individual optical parts (10, 10') can be assembled in a force-closed fashion.

14. The optical device as claimed in patent claim 12, characterized in that said first and second individual optical parts (10, 10') can be bonded to one another.

15. The optical device as claimed in patent claim 3, characterized in that said first and second individual optical parts (10, 10') can be assembled in a force-closed fashion and/or can be bonded to one another.

16. The optical device as claimed in patent claim 3, characterized in that there are provided in said at least one individual optical part (10, 10', 10") one or more cavities (1, 2) of any desired shape whose cavity boundary surfaces act as mirrors and/or lenses and/or beam splitters inside said individual part (10, 10', 10"), the longitudinal extent of the cavities (1, 2) extending parallel to the y-direction or to the x-direction, and its cavities preferably being fashioned as continuous cavities (1, 2) from said first outer surface up to said second outer surface.

17. The optical device as claimed in claim 3, characterized in that said first and second individual optical parts (10, 10') and said further individual optical part (10") have a refractive index that deviates from 1 by at least +/−0.1.

18. The optical device as claimed in patent claim 1, characterized in that said further individual optical part (10") serving the purpose of connection to the LED light source (6) is likewise a solid waveguide that is integrated in the optical device (30) as an individual optical part.

* * * * *